United States Patent
Cai et al.

(10) Patent No.: US 7,543,289 B2
(45) Date of Patent: Jun. 2, 2009

(54) METHOD FOR ACCESSING AND COLLABORATING BETWEEN SERVLETS LOCATED ON DIFFERENT JAVA VIRTUAL MACHINES

(75) Inventors: Hong Cai, Beijing (CN); Wei Lu, Beijimh (CN); Bo Yang, Beijing (CN); Li Hua Tang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1128 days.

(21) Appl. No.: 10/890,729

(22) Filed: Jul. 14, 2004

(65) Prior Publication Data

US 2005/0044233 A1 Feb. 24, 2005

(30) Foreign Application Priority Data

Jul. 28, 2003 (CN) ............... 03 1 43674

(51) Int. Cl.
*G06F 9/455* (2006.01)
*G06F 3/00* (2006.01)
*G06F 15/16* (2006.01)

(52) U.S. Cl. ............ 718/1; 719/318; 709/217; 709/230

(58) Field of Classification Search ............ 718/1, 718/100; 709/217–219, 230, 246, 311; 719/318
See application file for complete search history.

(56) References Cited

U.S. PATENT DOCUMENTS

| 6,223,202 | B1 * | 4/2001 | Bayeh | 718/102 |
| 6,643,708 | B1 * | 11/2003 | Francis et al. | 709/246 |
| 6,704,764 | B1 * | 3/2004 | Ottati | 718/100 |

OTHER PUBLICATIONS

Cai, Hong, et al. "Session initiation protocol and Web services for next generation multimedia applications", 2002, Multimedia Software Engineering, 2002, Proceedings, Fourth International Symposium, on pp. 70-80.*

* cited by examiner

*Primary Examiner*—Van H Nguyen
*Assistant Examiner*—Kenneth Tang
(74) *Attorney, Agent, or Firm*—Scully, Scott, Murphy & Presser, P.C.; Gail H. Zarick, Esq.

(57) ABSTRACT

Presents remote servlets collaboration. A method includes: creating a common registry; creating an extended context in response to an external request, wherein the extended context can invoke the resources within the common registry; performing initializing configuration on a plurality of servlets, and registering a plurality of servlets in the common registry, wherein a plurality of servlets being located on different Java virtual machines, or being located in different servlet containers on the same Java virtual machine; and a plurality of servlets collaborate with each other by being invoked through the extended context. It can implement collaboration between servlets located on different virtual machines or even servlets on the same virtual machine but within different servlet containers, because in a converged application service system, not only between HTTP servlets or between SIP servlets but also between HTTP servlets and SIP servlets there is necessity to collaborate.

1 Claim, 8 Drawing Sheets

METHOD FOR ACCESSING AND COLLABORATING BETWEEN SERVLETS LOCATED ON DIFFERENT JAVA VIRTUAL MACHINES

FIELD OF THE INVENTION

The present invention relates to collaboration between different kinds of servlets in a request/response-oriented web service environment. More particularly, the present invention relates to collaboratively invocation between servlets that are located on the same or different (JVM) Java Virtual Machine.

BACKGROUND OF THE INVENTION

According to the definition in SUN's Java™ (a program language) Servlet Tutorial, servlets are Java modules that extend request/response-oriented servers, such as Java-enabled web servers. For example, a servlet might be responsible for taking data in an HTML order-entry form (get request from requestor's browser) and applying business logic used to update a company's order database (build the response dynamically and send back to the requester). Servlets are to servers what applets are to browsers. Unlike applets, however, servlets have no graphical user interface.

Actually, a servlet is an abstract concept, and it may be mapped to implementations of different kinds of protocols. It includes not only HTTP (Hypertext Transfer Protocol) servlet for processing HTTP request/response but also other format servlets such as SIP (Session Initiation Protocol) servlet. Since HTTP servlet is so common and most of the servlets are actually HTTP servlet, people almost forget about other possible formats of servlet.

FIG. 1 is a schematic view showing the working process of a typical HTTP servlet. In FIG. 1, after completing inputting in a page form (not shown) on a browser of client 100, a user sends an HTTP request to an HTTP Server (a common Web Application Server) 120 with servlets installed, the servlet container (not shown) in the HTTP server 120 maps the HTTP message to the corresponding Servlets therein, and then invokes the servlet. The servlet searches the database 130 for the corresponding data, builds a response message to the HTTP request, and sent the HTTP response message back to the client 100 to be browsed and used by the user. This is the working manner of a typical HTTP servlet.

Next, the servlet container in prior art will be described in detail with reference to FIG. 2. FIG. 2 shows the internal operational principle of a server and the architecture of a servlet container. In FIG. 2, server class 200 represents a server connected with a client through web (not shown) (all kinds of webs such as internet, etc.), which sends the HTTP message received from the client to the connector 204 through service class 202. Here, for example, the service class is the 8080 port, which is a physical connection between the server class 200 and the connector 204. At the connector 204, the HTTP message (physical data packet) sent from the service class 202 is converted into logical commands to form a HTTP request, and the HTTP request is sent to the servlet container 220. Moreover, the connector 204 also converts the HTTP response received from the servlet container 220 into a HTTP message, and sends the HTTP message to the client through service class 202 and server class 200. The servlet container 220 connected with connector 204 works in the upper layer of the Java Virtual Machine (JVM). A Java virtual machine can be viewed as a server with server functions, and can be provided with a plurality of servlet containers 220.

In the order from lower layer to upper layer, a servlet container 220 contains a container engine 206 for starting up and maintaining the work of the whole servlet container 220; a virtual host 208 working in the upper layer of the container engine 206 for simulating a plurality of hosts; a context 210 working in the upper layer of the virtual host 208 and being responsible for managing a concrete application running in the virtual host; a wrapper 216 working in the upper layer of the context 210, for managing a certain servlet composing a application; and an HTTP servlet 212 working in the top layer of the servlet container 220 and being the most elementary unit to complete a certain work or task.

When the Java virtual machine is started up, it will use the service class 202 to create a HTTP connector 204 and a container engine 206. A container engine 206 may consist of and manage many virtual hosts 208. A host 208 may consist of and manage many contexts 210. A context 210 may consist of and manage many wrappers 216. And a wrapper 216 will actually instantiate and process the received HTTP request by using servlets 212.

When an HTTP request is sent to the servlet container 220, corresponding servlets 212 are generally invoked only by the servlet container 220 through context 210. In addition, a servlet 212 can invoke other servlets (not shown) in the same servlet container 220, or be invoked by other servlets (not shown) in the same servlet container 220. There is no other way to invoke a servlet 212 itself. For example, invoking a servlet using a normal Java class is invalid. Also from the inherent property of servlet, after a servlet is initiated due to an incoming request, it can invoke other Java codes, but there is no way for the servlet 212 to directly and automatically get an event from outside of the container 220.

As described above, different servlets 212 within the same context 210 may share some states and events. But, besides the HTTP request, there is no way for a normal servlet 212 to simulate a servlet from outside of a context 210. For example, it is impossible for servlets on two different Java virtual machines to collaborate, such as sharing state information or send events to each other. Even within the same Java virtual machine, if two servlets are located in two different servlet containers, it is still impossible for these two servlets to collaborate. It is a limitation of the normal servlet in prior art.

It is mentioned in the above that the "servlet" is just a concept, and the HTTP servlet is only one of various possible formats. Now, with another important protocol, i.e. "SIP (Session Initiation Protocol)", a new kind of servlet, i.e. "SIP servlet" has been defined in the Java standardization organization. A HTTP servlet is mainly used to process web request, while a SIP servlet is mainly used to process VoIP (Voice over IP) application. A SIP servlet inherits the common features of general HTTP servlet object, but there exist great differences between them, as listed in Table 1.

TABLE 1

| | Model | Mapping | Invoking |
| --- | --- | --- | --- |
| HTTP Servlet | Request/Response | Use servlet "path" to map a HTTP request to a servlet that process the request | Normally invoked by end user using a browser |
| SIP Servlet | Can use request/response model and create new requests on its own initiative, or forward the received requests to one or more target address | Use predefined "mapping rule" to map a SIP request to a SIP servlet | Normally invoked by a SIP client |

It can be seen from Table 1 that a HTTP servlet can only perform one to one process of request/response, i.e. it can only generate one response to one HTTP request, and sends the response back to the client. And a SIP servlet not only can generate requests on its own initiative, but also can generate a plurality of branch requests on the basis of one request, which will be sent to different servers or Java virtual machines, and generates corresponding response so as to accomplish more complicated tasks. It can be seen that more complicated functions (such as multiparty interactive conference) of web application services, etc. can be implemented by applying HTTP servlet and SIP servlet simultaneously, thereby the user is provided with more facilitated services.

When it is necessary to implement inter-invoke of a HTTP servlet and a SIP servlet or other kinds of servlets so as to accomplish specific tasks, we refer to it as converged application service. As the popularization process of network is deepened and developed, the capability of convergently processing different protocols including HTTP and SIP appears especially important in the converged application service.

In the converged application service, servlets are used as the programming model for a specific task and different protocols (such as HTTP protocol and SIP protocol), wherein a plurality of protocols may be used instead of one single protocol such as HTTP. This means that different servlet containers are needed. One typical example of such converged application service is so-called "Web Scheduled Conference System" in which HTTP protocol is used to input scheduling information for the conference and SIP protocol is used to initiate calls from conference server to the individuals participating the conference. However, in the prior art, the servlet model only cares about HTTP protocol, and only those servlets that belong to the same (HTTP) servlet container can collaborate with each other. The current solution to solve the above problem is only to modify the HTTP servlet container.

FIG. 3 is a schematic view showing the mode for implementing converged application service in the prior art. As shown in FIG. 3, in the prior art, in order to implement the converged application service, HTTP servlet and SIP servlet must be built in the same context respectively, and the converged application service provider must provide both HTTP servlet and SIP servlet. But it is very difficult in the prior art. Since they rely on the supports of different protocols, and a HTTP servlet provider may not be so skillful at SIP while a SIP servlet provider may not be so skillful at HTTP, rewriting the primary codes of current servlet container in an application server to support SIP protocol cost a lot of time and funds. Further, if the service provider collectively constructs the HTTP servlet and the SIP servlet from different venders upon the same context, there will be disputes on the aspect of intellectual property. Further, even if the problem is solved in the above manner, there will be difficulties when more protocols are needed to support the converged application service.

SUMMARY OF THE INVENTION

To solve the problems in the prior art, an aspect of the present invention is to provide a method for remote servlets collaboration, said method comprising the steps of: creating a common registry; creating an extended context in response to an external request, wherein said extended context can invoke the resources within said common registry; performing initializing configuration on a plurality of servlets, and registering said plurality of servlets in said common registry, wherein said a plurality of servlets being located on different Java virtual machines, or being located in different servlet containers on the same Java virtual machine; and said plurality of servlets collaborate with each other by being invoked through said extended context.

The present invention further provides a system of remote servlets collaboration, said system comprising: a plurality of servlet containers, each containing at least one servlet, for processing requests from clients and maintaining the corresponding sessions, said a plurality of servlet containers being located on the same Java virtual machine or being located on different Java virtual machines separately; a common registry for managing the information registered therein; and an application session module for creating an extended context in response to an external request and performing initializing configuration on each servlet, and registering each servlet in said common registry, wherein said extended context can invoke the resources within said common registry, and said respective servlets access each other by being invoked through said extended context.

The present invention can implement the collaboration between servlets located on different Java virtual machines or even servlets on the same Java virtual machine but within different servlet containers, because in a converged application service system, not only between a HTTP servlet or a SIP servlet but also between a HTTP servlet and a SIP servlet there is necessity to collaborate.

BRIEF DESCRIPTION OF THE DRAWINGS

The above and other objects, features, and advantages of the present invention will become more apparent from the following detailed description when taken in conjunction with the accompanying drawings, in which.

DETAILED DESCRIPTION OF THE INVENTION

The present invention provides methods, systems and apparatus of remote servlets collaboration. An example method includes the steps of: creating a common registry; creating an extended context in response to an external request, wherein said extended context can invoke the resources within said common registry; performing initializing configuration on a plurality of servlets, and registering said plurality of servlets in said common registry, wherein said a plurality of servlets being located on different Java virtual machines, or being located in different servlet containers on the same Java virtual machine; and said plurality of servlets collaborate with each other by being invoked through said extended context.

The present invention further provides an example of a system for remote servlets collaboration. In an embodiment the system includes: a plurality of servlet containers, each containing at least one servlet, for processing requests from clients and maintaining the corresponding sessions, said a plurality of servlet containers being located on the same Java virtual machine or being located on different Java virtual machines separately; a common registry for managing the information registered therein; and an application session module for creating an extended context in response to an external request and performing initializing configuration on each servlet, and registering each servlet in said common registry, wherein said extended context can invoke the resources within said common registry, and said respective servlets access each other by being invoked through said extended context.

The present invention can implement the collaboration between servlets located on different Java virtual machines or even servlets on the same Java virtual machine but within different servlet containers, because in a converged application service system, not only between a HTTP servlet or a SIP servlet but also between a HTTP servlet and a SIP servlet there is necessity to collaborate.

Figure 4:
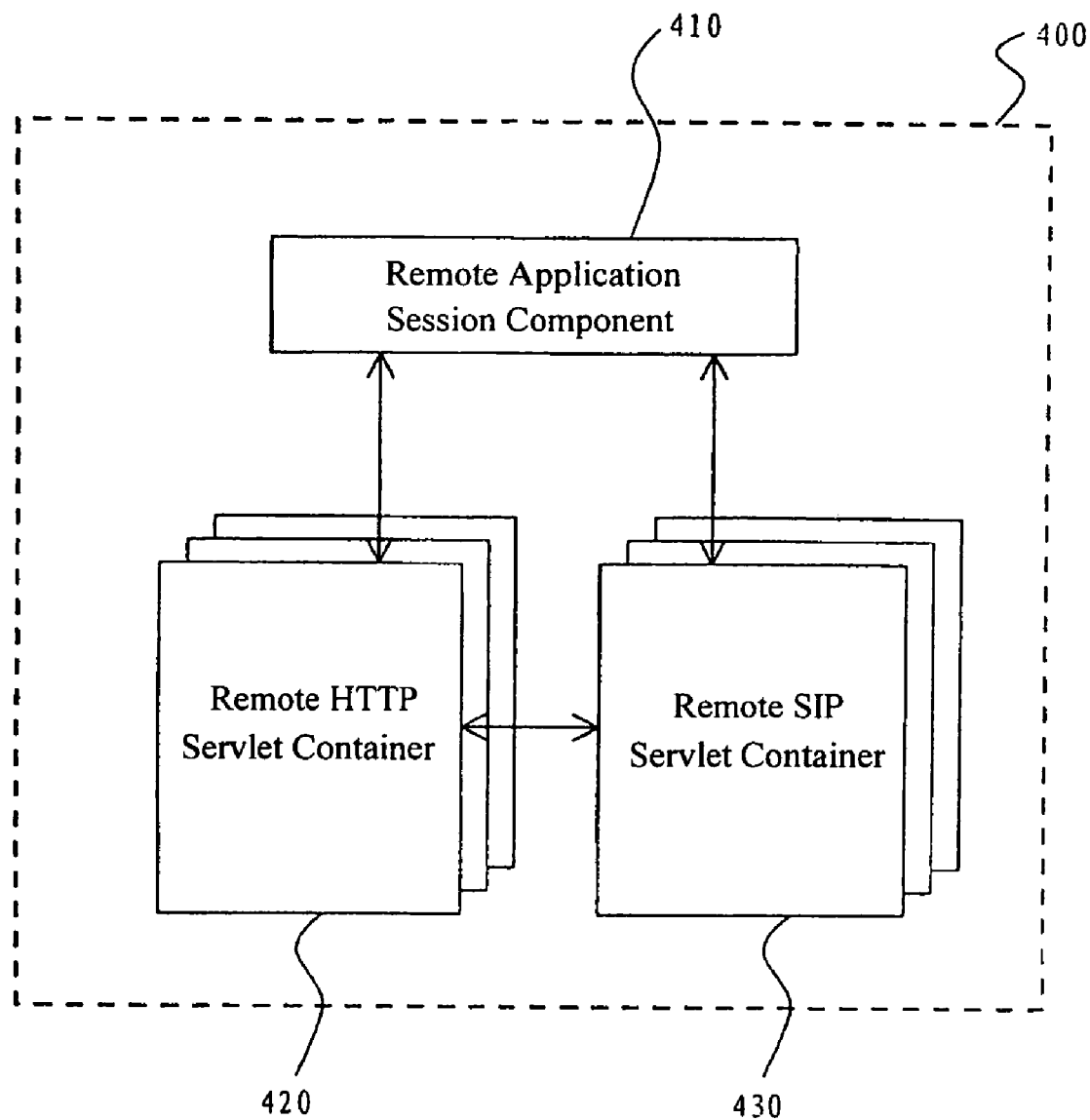
FIG. 4 is a block diagram of a system which supports the converged application service according to the embodiment of the present invention.

Next, an embodiment of the present invention will be described in detail in conjunction with the attached drawings. FIG. 4 is a block diagram of a system 400 which supports the converged application service according to the embodiment of the present invention. The system 400 of the present invention comprises a remote application session component 410, a remote HTTP servlet container 420, and an SIP servlet container 430. Wherein, the remote application session component 410 corresponds to a converged application service, and it can manage a plurality of sessions including HTTP sessions and SIP sessions. The functions of the remote application session component 410 can be implemented with RMI (Remote Method Invocation, a known method in the prior art) interface or it could be packaged into an EJB module.

The remote application session component 410 maintains a set of XML (extensible Markup Language) files including Deployment Description file and configuration file for loading necessary resources and configuration when the application starts up, such as initiating timers, creating relationship of the remotes servlets that constitute the converged application, etc. These remote servlets that serve a specific application constitute a remote servlets group.

Figure 1:
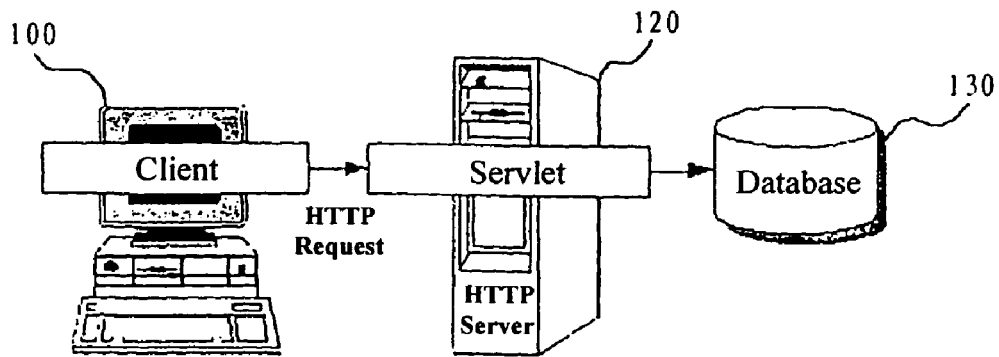
FIG. 1 is a schematic view showing the working process of a typical HTTP servlet.
Figure 2:
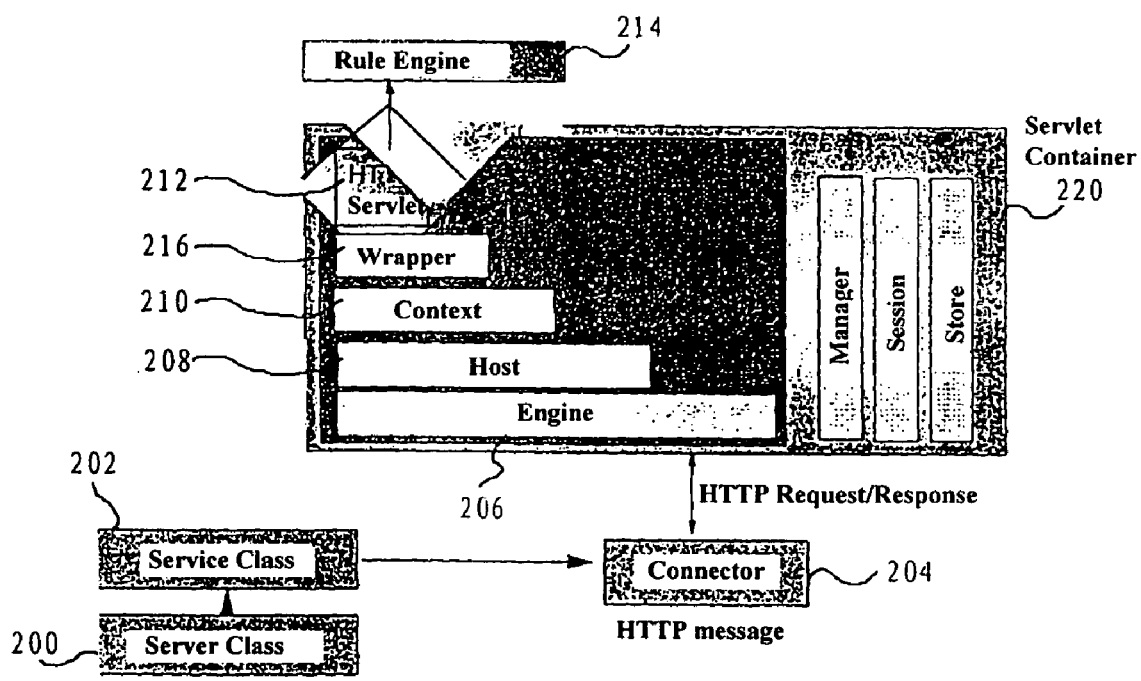
FIG. 2 shows the internal operational principle of a server and the architecture of a servlet container.
Figure 3:
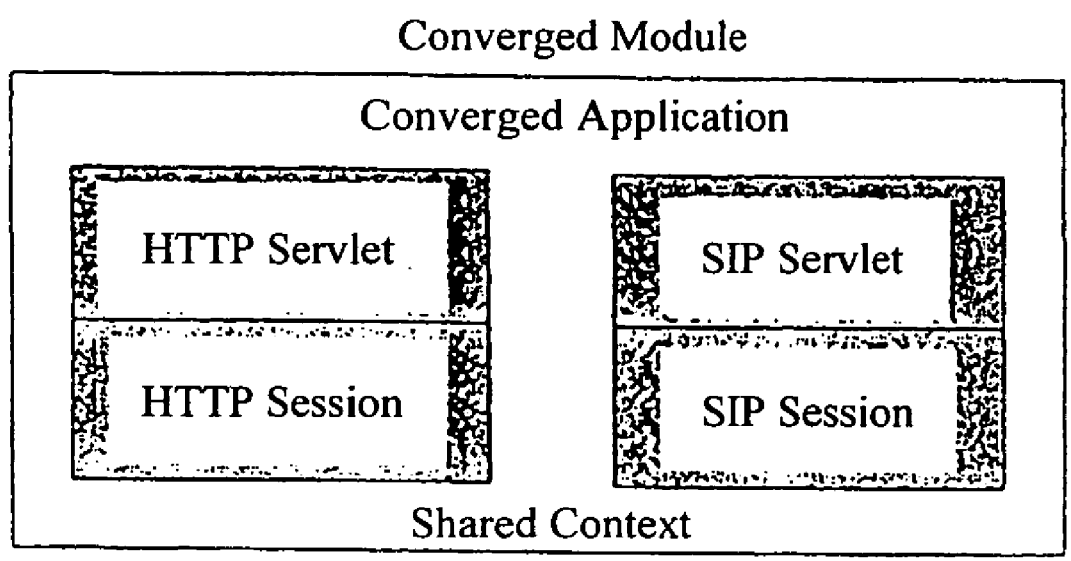
FIG. 3 is a schematic view showing the mode for implementing the converged application service in the prior art.

The remote HTTP servlet container 420 (the number of which can be more than one) supports web-based operations. It receives a HTTP request from a client (client 100 as shown in FIG. 1), sends out a HTTP response, and maintains its HTTP session (request/response). That is, a pure HTTP request/response is processed within the HTTP servlet container 420. In addition, depending on the HTTP servlet's logic, the remote HTTP servlet container 420 may also send out events to the remote SIP servlet container 430 or to the remote application session component 410 (particularly, the extended context which it manages, the details will be described hereinafter).

The remote SIP servlet container 430 (the number of which can be more than one) supports call control or instant message. It receives and sends out a SIP request/response and maintains its session (request/response). That is, a pure SIP request/response is processed within the SIP servlet container 430. In addition, depending on the SIP servlet's logic, the remote SIP servlet container 430 may also send out events to the remote HTTP servlet container 420 or to the remote application session component 410 (particularly, the extended context which it manages, the details will be described hereinafter).

Next, the concrete mode of implementing the present invention will be described in conjunction with FIGS. 5, 6, 7 and 8.

Figure 5:
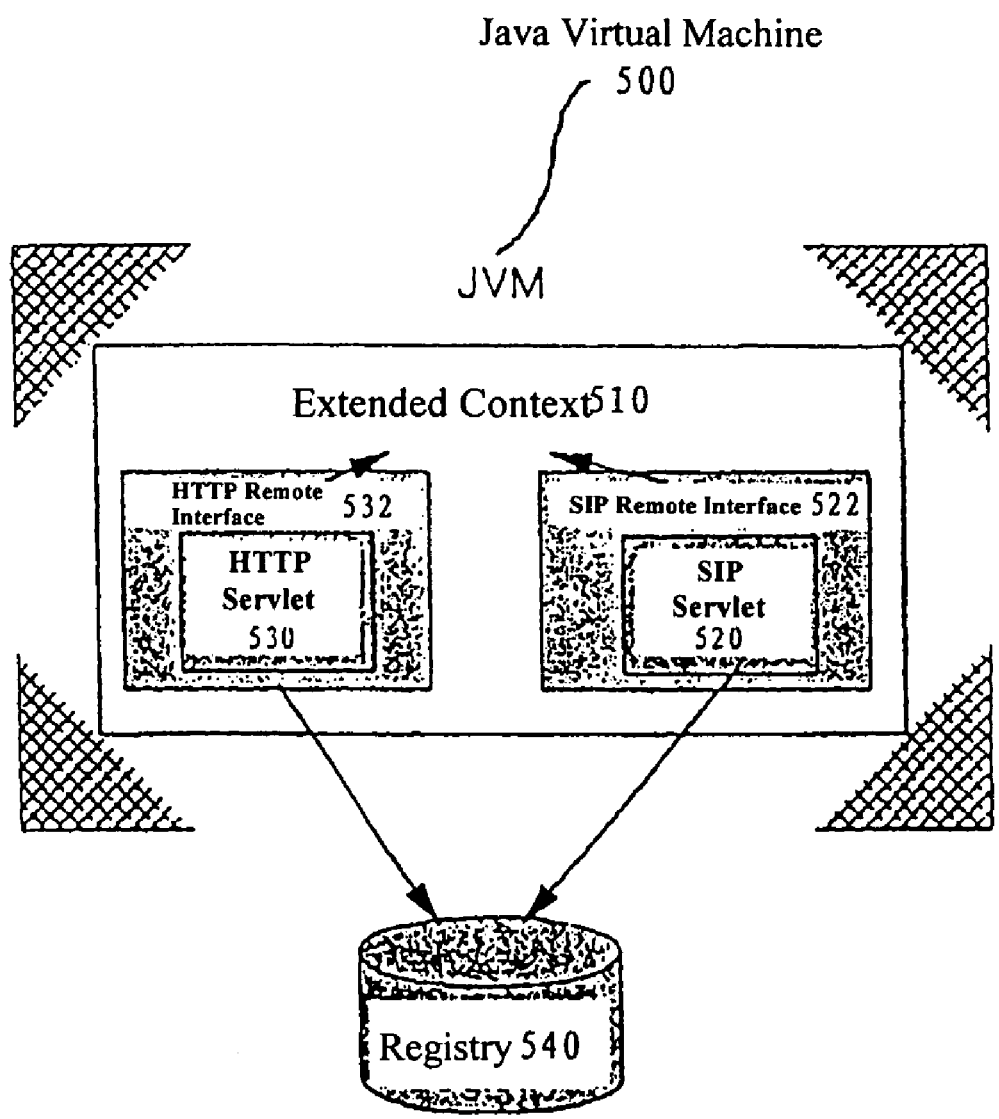
FIG. 5 is a view of implementing remote invoke between a HTTP servlet and a SIP servlet according to the embodiment of the present invention, wherein the HTTP servlet and the SIP servlet are located in the same extended context.

FIG. 5 is a view of implementing remote invoke between a HTTP servlet and a SIP servlet according to the embodiment of the present invention, wherein the HTTP servlet and the SIP servlet are located in the same extended context. In order to implement remote invoke between the HTTP servlet and the SIP servlet, the interface of the HTTP servlet 530 and the interface of the SIP servlet 520 are extended into remote interfaces at first, as shown in FIG. 5.

The operation for extending the interfaces is performed in the manner described in detail below. Namely, a running LDAP (Lightweight Directory Access Protocol) registry (refer to as "registry" hereinafter) 540 is searched for. If it can not be found, then a new LDAP registry 540 is created, and the port number where the registry 540 is running is obtained. Lightweight Directory Access Protocol is a standard protocol which makes applications (products) from different vendors capable of sharing the registry in accordance with the standard. Registry 540 is located on the Java virtual machine 500, or it can be located on other devices which can be shared, and for maintaining all kinds of information registered therein.

Then, when the Java virtual machine 500 starts up due to the reception of a request for a certain application, an extended context 510 is created dynamically. There can be a plurality of the created extended contexts 510, each corresponds to a different application example. And the created extended context 510 can invoke the information resources registered in the registry 540 through the port number where the registry 540 is running.

As well known, a conventional "context" means a place where servlets from the same servlet container can share information, it is located within a certain servlet container. However, the concept of "extended context" proposed in the present invention refers to a place where remote servlets and non-remote servlets share information. It is located on the Java virtual machine 500 instead of within a certain servlet container. An "extended context" itself can be a remote object depending on the concrete implementation, or it can be constructed as an EJB module, and managed by remote application session component 410.

After an extended context 510 is created, the remote application session component 410 initializes (e.g. configures parameters of each interface, initiates timers and the like) the HTTP servlets 530 in each HTTP servlet container and the SIP servlets 520 in each SIP servlet container (although only one HTTP servlet and one SIP servlet is shown in FIG. 5, the number of them can be more than one) with the relevant files maintained therein.

Then, the remote application session component 410 registers the name (or other identifications) of the HTTP servlet 530 and the SIP servlet 520 into the registry 540, and makes their names capable of being identified. Thus, the information on the names of the HTTP servlet 530 and the SIP servlet 520 is included in the registry 540. This registering process is implemented by RMI.

In addition, when the parameters (such as name or other identifications) of the HTTP servlet 530 and/or the SIP servlet 520 are registered into the registry 540, the remote application session component 410, as required, sets corresponding life cycle for each servlet in the registry 540 and maintains the life cycles. When a counter (not shown) indicates that the life cycle of a certain servlet is end, the remote application session component 410 deletes the relevant parameters of the servlet from the registry 540, so that the servlet is not provided with the functions of remote invoking or being remote invoked any longer.

Thus, the interfaces of the HTTP servlet 530 and the SIP servlet 520 are extended into remote interfaces, i.e. the HTTP remote interface 532 and SIP remote interface 522 in FIG. 5. The HTTP instance codes for implementing this extended interface is as follows:

```
public abstract class RemoteHttpServlet extends HttpServlet implements Remote {
    protected Registry registry; //The registry for the servlet
    /**Begins the servlet's RMI operations. Causes the servlet to export itself and then
bind itself to the registry. **/
    public void init(ServletConfig config) throws ServletException {...}
    /**Halts the servlet's RMI operations. Causes the servlet to unbind itself from the
registry**/
    public void destroy( ) { unbind( ); }
    /**Returns the name under which the servlet should be bound in the registry. **/
    protected String getRegistryName( ) {...}
    /**Returns the port where the registry should be running. **/
    protected int getRegistryPort( ) {...}
    /**Binds the servlet to the registry. Creates the registry if necessary. **/
    protected void bind( ) {
    //Try to find the appropriate registry already running
    //If we couldn't find it, we need to create it.
    //If we get here, we must have a valid registry.
    //Now registry this servlet instance with that registry.
    }
    /**Unbinds the servlet from the registry. Logs any errors. **/
    protected void unbind( ) {...}
```

After the interfaces of the HTTP servlet 530 and the SIP servlet 520 are extended into the HTTP remote interface 532 and the SIP remote interface 522, these servlets should be further compiled using RMI compiler.

The extended context 510 can utilize the resources in the registry 540 by identifying the port number where the registry 540 is running. That is to say, both the HTTP servlet 530 and the SIP servlet 520 are visible to the extended context 510, and these servlets are visible to each other. When a certain application is running on the Java virtual machine 500, the extended context 510 corresponding to the application can invoke the needed HTTP servlet 530 and/or SIP servlet 520 through the entries registered in the registry 540, and use their respective business logic to accomplish corresponding functions. We refer to these servlets invoked or managed by the extended context 510 utilizing the registry 540 as a remote servlet group.

A remote servlet group can include various remote servlets on the same or different Java virtual machine 500, it is necessary for them to exchange messages with each other through the extended context 510, just like sharing a "Chat Room", and they accomplish certain specific tasks by invoking and collaborating with each other at any time, an example of the tasks is a converged application service. Each remote servlet sends various events to the extended context 510, and thereby broadcast these events to all other remote servlets. The information which can be "seen" by the servlets within the extended context 510 is not normal words but various events, such as a call completed, or a request got from a web browser.

For example, an instance of the interaction (invoke) between respective remote servlets can be implemented as follows:

```
public class InvokerServlet extends RemoteHTTPServlet {
    //Assume Invoker Servlet is also a remote servlet
    private String getRegistryHost( ) {...}
    private int getRegistryPort( ) {...}
    private String getRegistryName( ) {...}
    private String InvokeUsingRMIObject( ) {
        Registry registry=LocateRegistry.getRegistry(getRegistryHost( ),
        getRegistryPort( ));
        InvokedServlet invoked=
        (InvokedServlet)registry.lookup(getRegistryName( ));
        return...;
    }
}
```

The formation of the servlet group may be dynamic. That is, the remote servlets constituting the remote servlet group may be dynamically built according to the deployment descriptor file (the same as deployment descriptor file normally used in web application (J2EE)), and listening to various events within the extended context 510 in its life cycle.

Figure 7:
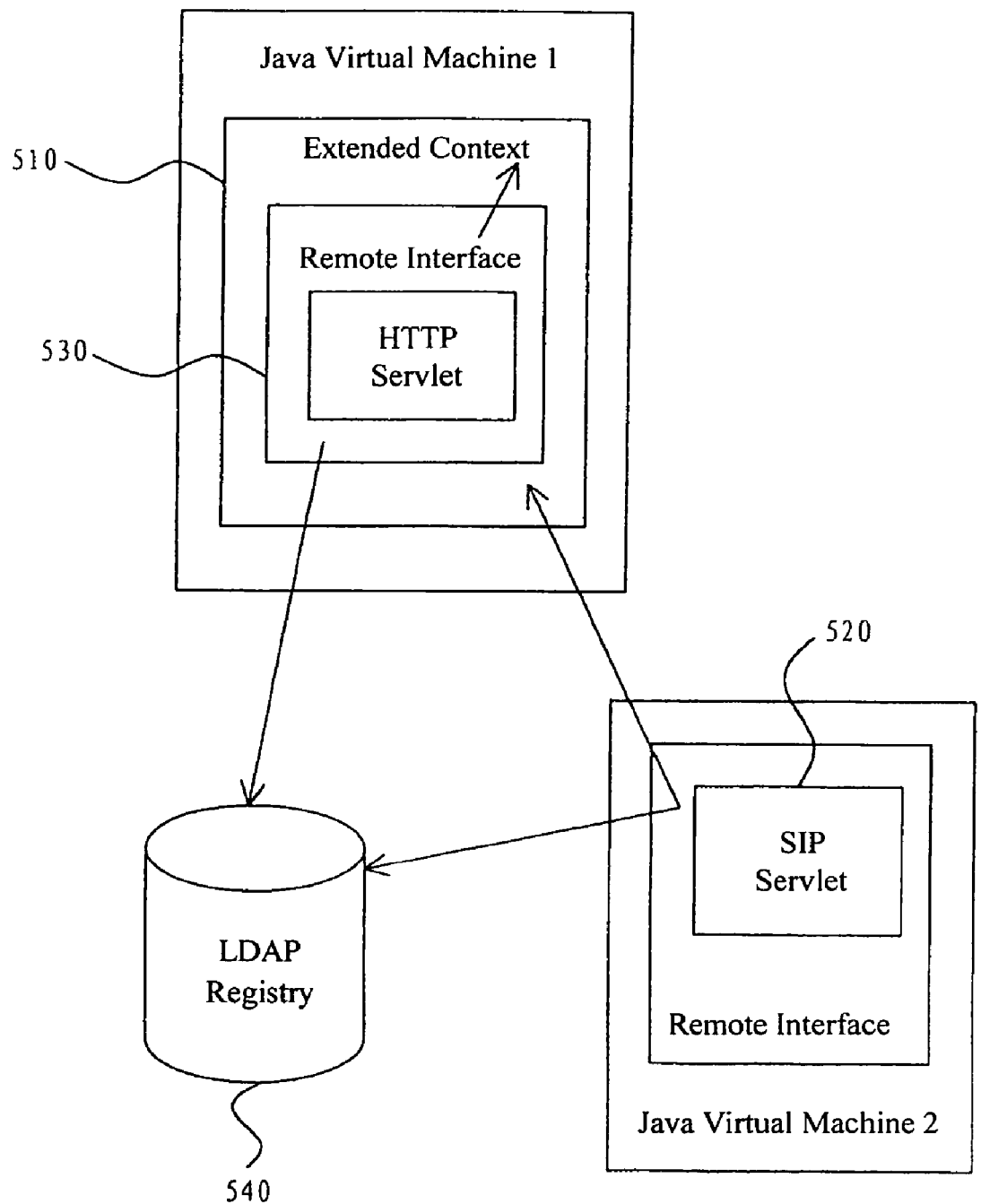
FIG. 7 is a view of implementing remote invoke between a HTTP servlet and a SIP servlet according to the embodiment of the present invention, which is suitable to a conventional web server provider.
Figure 8:
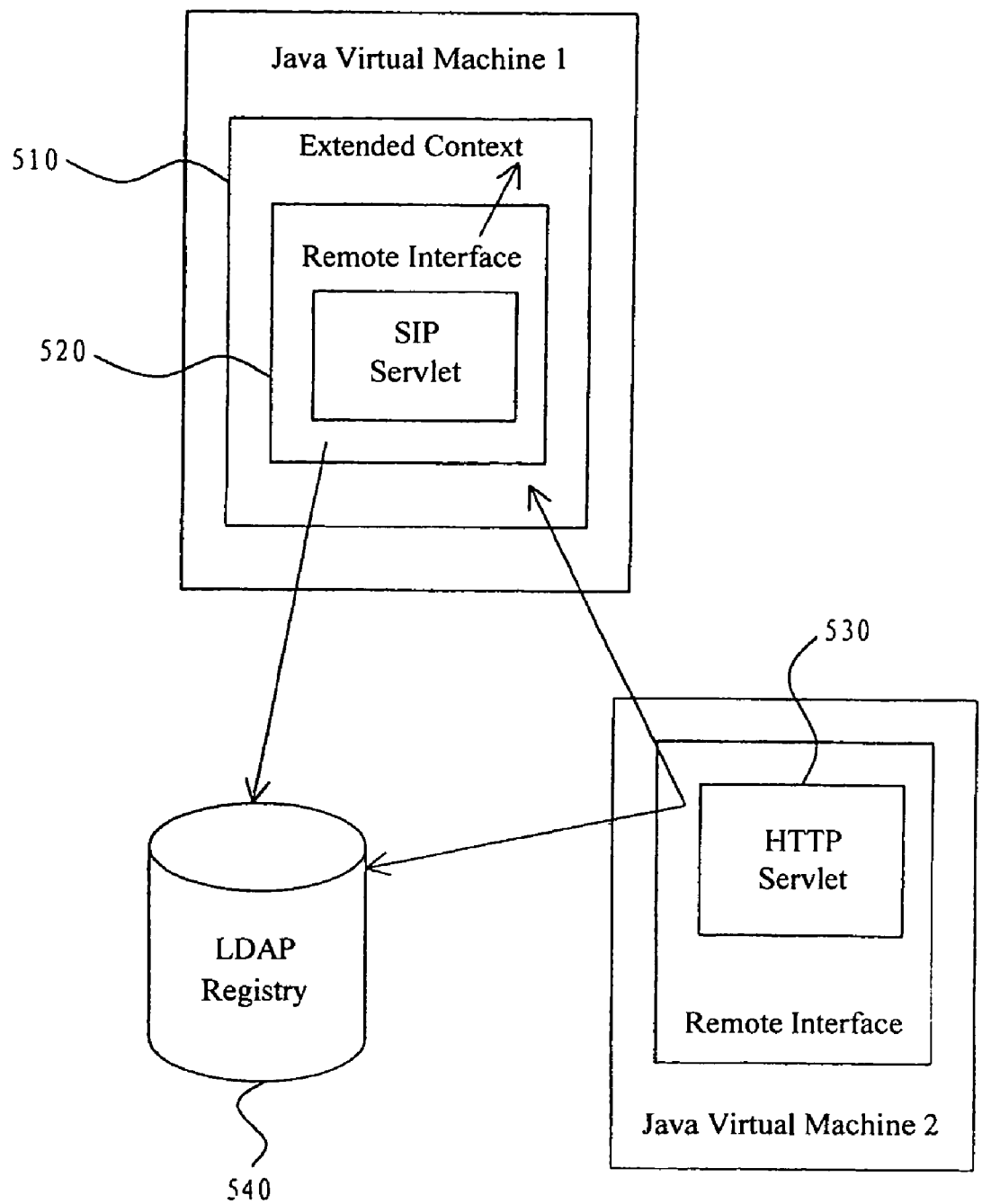
FIG. 8 is a view of implementing remote invoke between a HTTP servlet and a SIP servlet according to the embodiment of the present invention, which is suitable to a new SIP web server provider.

Thus, an environment configuration for implementing remote invocation between the HTTP servlet and the SIP servlet is built. Of course, the above environment configuration can also be founded in other manners as shown in FIGS. 6, 7 and 8.

Figure 6:
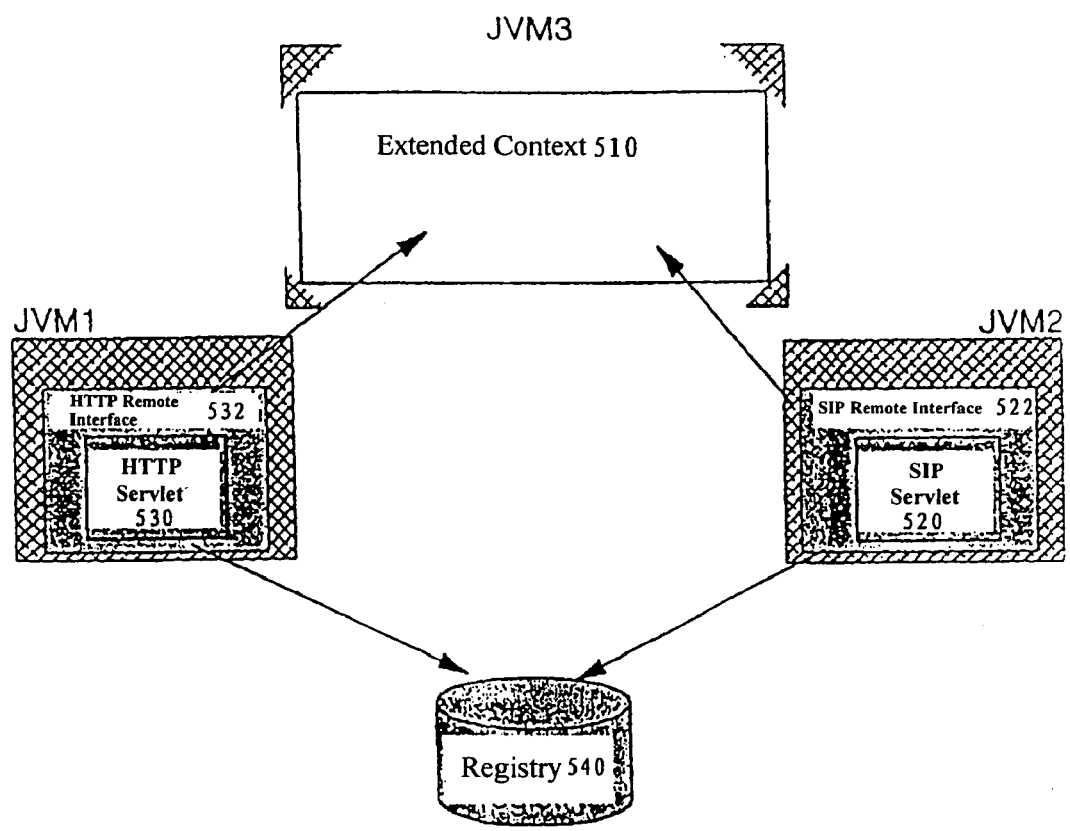
FIG. 6 is a view of implementing remote invoke between a HTTP servlet and a SIP servlet according to the embodiment of the present invention, wherein the HTTP servlet, the SIP servlet and the extended context are located in different Java virtual machines.

In FIG. 6, the HTTP servlet 530 and the SIP servlet 520 are located on different Java virtual machines 1 and 2 respectively, and the extended context 510 is located in the Java virtual machine 3. FIG. 7 and FIG. 8 show two other different distributing manners respectively, wherein the configuration in FIG. 7 is suitable to a conventional web server provider, while the configuration in FIG. 8 is suitable to a new SIP web server provider. These different distributing manners are substantially the same as the above-mentioned environment configuration for implementing remote invocation between the HTTP servlet and the SIP servlet, except that their locations are different.

In addition, in the present invention, for the sake of network security, before the remote servlet could access other remote servlets through the extended context 510, it must get authentication from a security manager (not shown) to verify if the remote servlet is the legal one to invoke or to be invoked. Only when the remote servlet is legal, it is allowed to invoke other remote servlets or be invoked by other remote servlets; otherwise, it is not allowed.

Figure 9:
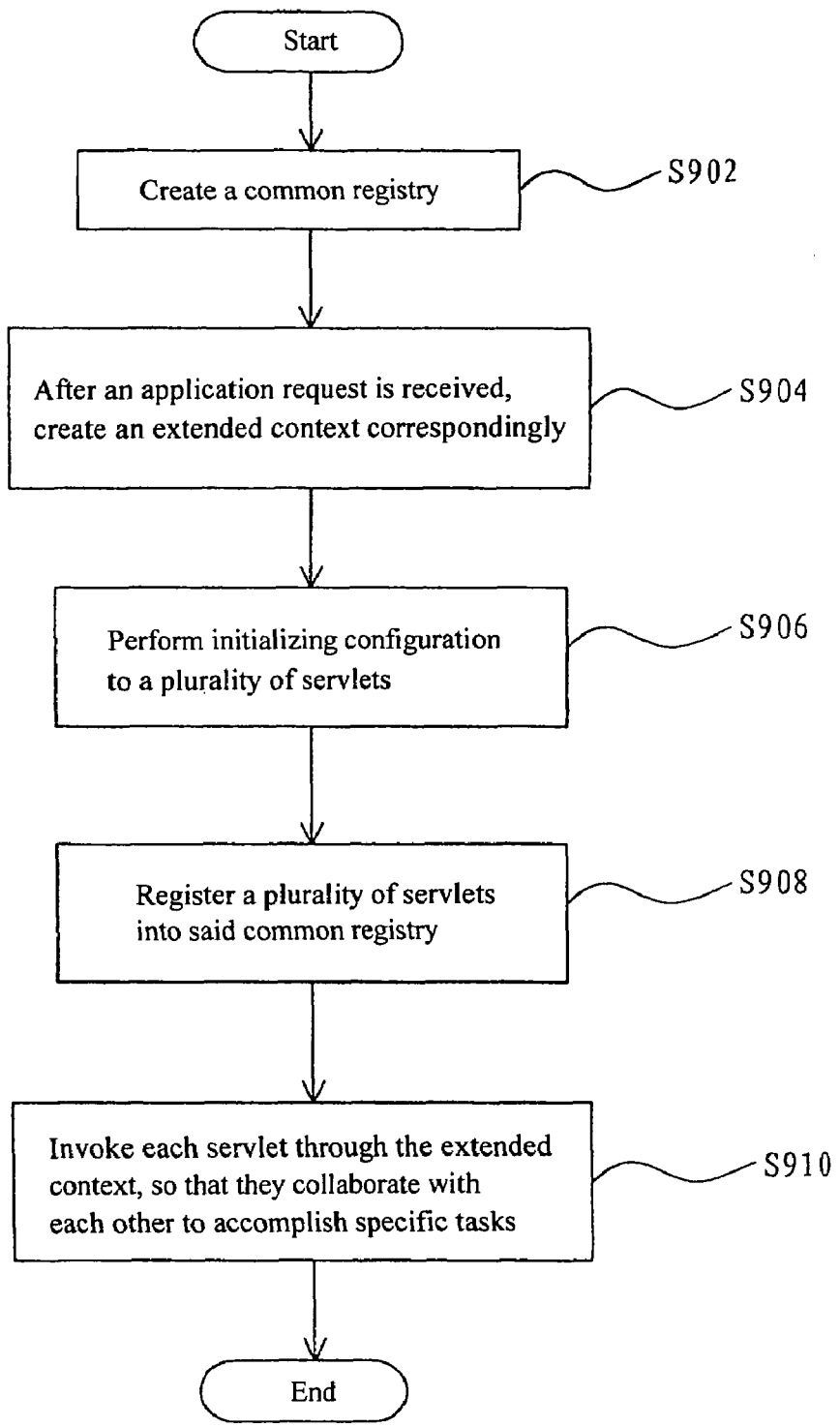
FIG. 9 is a flow chart of the process performed by a system which supports the converged application service according to the present invention.

Next, the flow of the process performed by the system which supports the converged application service according to the present invention will be described in detail in conjunction with FIG. 9. FIG. 9 is a flow chart of the process performed by a system which supports the converged application service according to the present invention. Wherein, in step S902, a common registry 540 is created on a Java virtual machine (such as web server) 500, the registry 540 is a registry which makes products from different vendors capable of sharing the information therein, such as a registry in accordance with LDAP protocol. Then, in step S904, an extended context 510 is created in response to a request from a client, the extended context 510 corresponds to a specific application, and can invoke the resources within said common registry 540 through the port where the common registry 540 is running.

Next, in step S906, the remote application session component 410 performs initializing configuration to a plurality of servlets 520 and 530 by using the deployment descriptor file and configuration file it possesses, then the process flow goes forward to step S908. In step S908, the remote application session component 410 registers said a plurality of servlets 520 and 530 in said common registry 540. Here, said a plurality of servlets 520 and 530 may be located on different Java virtual machines, or may be located in different servlet containers on the same Java virtual machine. In step S910, said a plurality of servlets 520 and 530 are invoked through said extended context 510, so that each servlet 520 and 530 can access and collaborate with each other, so as to accomplish specific tasks.

According to the present invention, collaboration among a plurality of servlets can be implemented, wherein these servlets are located on different Java virtual machines, or they are located in different servlet containers even if they are located on the same Java virtual machine. With the method and the system according to the present invention, even if new protocol and application appear, invocation and collaboration between servlets supporting different protocols can also be implemented easily with low cost, so as to provide the user with better converged application service.

As stated above, a concrete embodiment of the present invention has been described in detail in conjunction with the drawings. It will be understood by those skilled in the art that various changes and modifications according to the spirit and ideas of the present invention are all within the scope sought for protection in the present invention. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for remote servlets collaboration, said method comprising the steps of:

creating a common registry;

creating an extended context in response to an external request, wherein said extended context can invoke the resources within said common registry, said extended context indicating a location in a Java virtual machine where a plurality of servlets share information; and performing initializing configuration on said plurality of servlets, and registering said plurality of servlets into said common registry, wherein said plurality of servlets are located on different Java virtual machines, or located in different servlet containers on the same Java virtual machine, said plurality of servlets comprising Hypertext Transfer Protocol (HTTP) servlets and Session Initiation Protocol (SIP) servlets, and said registering including extending interfaces of said HTTP servlets and SIP servlets into respective HTTP remote and SIP remote interfaces such that said plurality of servlets are visible to said extended context and visible to each other, said plurality of servlets accessing and collaborating with each other for accomplishing a task by being invoked through said extended context, said extended context and said plurality of servlets being located in said different servlet containers on the same Java virtual machine or on said different Java virtual machines, said extended context receiving events from said plurality of servlets, and broadcasting the events to other servlets.

* * * * *